United States Patent [19]
Barry

[11] Patent Number: 5,479,324
[45] Date of Patent: Dec. 26, 1995

[54] ILLUMINATED GAS TANK OR SHELL

[76] Inventor: James E. Barry, 3251 NW. 114th Ave., Coral Springs, Fla. 33065

[21] Appl. No.: 169,999

[22] Filed: Dec. 17, 1993

[51] Int. Cl.⁶ ........................................ B62J 6/00
[52] U.S. Cl. ........................ 362/72; 362/83.3; 362/806; 280/835
[58] Field of Search ................... 362/92, 80, 82, 362/83.3, 806; 180/219; 280/835, 288.4; 40/590

[56] References Cited

U.S. PATENT DOCUMENTS

| | | | |
|---|---|---|---|
| 1,337,872 | 4/1920 | Zahnow | 362/82 |
| 2,891,140 | 6/1959 | Huff | 362/80 |
| 3,358,135 | 12/1967 | Weismantel | 362/80 |
| 4,000,593 | 1/1977 | Cohen | 40/580 |
| 4,557,517 | 12/1985 | Bolduc et al. | 40/580 |

FOREIGN PATENT DOCUMENTS

| | | | |
|---|---|---|---|
| 0077383 | 3/1990 | Japan | 280/835 |
| 0469692 | 7/1937 | United Kingdom | 40/590 |

*Primary Examiner*—Ira S. Lazarus
*Assistant Examiner*—Y. Quach
*Attorney, Agent, or Firm*—Malin, Haley, DiMaggio & Crosby

[57] ABSTRACT

Disclosed is a double-walled gasoline or fluid tank having a hollow space allowing light to be visible externally through a variety of openings or designs. A concave side portion of an existing tank is removed and a flat side wall, having an illumination device attached thereto, is attached where the original side portion was removed to create a new tank. An opening is created on the original side portion and the original side portion is reattached to the tank. The illumination device provides light through the opening in the original side portion.

16 Claims, 3 Drawing Sheets

ILLUMINATED GAS TANK OR SHELL

BACKGROUND OF THE INVENTION

1. Field of the Invention

The present invention relates generally to motorcycles and more particularly to installing illumination means within the gasoline tank area of a motorcycle.

2. Description of the Prior Art

The motorcycle has been a means of fun and relatively inexpensive way of traveling for many years. Recently, the motorcycle has found increased popularity and has become widely accepted by a substantial portion of the purchasing public as their primarily means of traveling. Accordingly, sales figures for various motorcycle companies have reached new highs in recent years.

One problem which has continuously plagued motorcyclist is the visibility of the motorcycle while riding especially during night travel. This problem is further emphasized by the fact that many motorcyclist wear dark clothing when riding. Thus, many accidents involving motorcycles are the result of the non-motorcyclist failing to see the motorcyclist. As the motorcycle itself provides minimal, if any, protection to the motorcyclist, many accidents involving motorcycles result in serious bodily injury or even death to the motorcyclist. Such severe consequences often occur at relatively low traveling speeds.

In the automobile and truck industry the advent of neon lighting, ranging in various colors, around the license plate and/or under the frame of the vehicle has recently been used to enhance the visibility of the vehicle during nighttime driving as well as acting as novelty device. However, the use of neon lighting is not as readily adaptable or applicable to motorcycles. Another problem is the fact that many motorcyclists remove or disconnect the turn signals from their motorcycle feeling that the signals take away from the aesthetic features of the motorcycles as well as their own individuality. Thus, frequently no indication is given to other vehicles on the road when these motorcyclists are preparing to turn which in turn results in unnecessary accidents.

Thus, what is needed in the art is a device or apparatus that allows for better illumination and visibility of the motorcycle during night traveling. In addition, the device must be safe and not increase the chance of serious injury. It is, therefore, to the effective resolution of the aforementioned problems and shortcomings that the present invention is directed.

SUMMARY OF THE INVENTION

Generally, the invention relates to an illuminated gasoline tank for a motorcycle. A gasoline tank is constructed with a double-walled, hollow space allowing light to be visible externally through a variety of openings (designs). The design can incorporate solid or flashing lights, or could be used as substitute turn signals.

In the first embodiment, at least one, and preferably both, outside portions of an existing gasoline tank are removed thus creating concave side panel portions and an opening in the sides of the gasoline tank. The side panels are removed by conventional means such as laser cutting, sawing, etc. A flat side piece, with illumination means attached thereto, is welded to the gasoline tank at the side opening to seal the gasoline tank. An opening or design is created in the concave side panel and the side panel is welded back onto its original position on the side of the gasoline tank. A wire or cord which is connected to the illumination means, is attached to the motorcycle battery, turn signal, etc. to generate light through the opening on the side panel when desired.

In a second embodiment, the gasoline tanks are manufactured with the flat side piece and illumination means, and also are provided with connecting means for attachment of one of a plurality of side panels. In this embodiment various design side panels can be interchanged by the motorcyclists to suit his or her individual style. Thus, a multitude of transparent inserts (mounted internally) can be utilized to change the outward appearance of the illuminated gasoline tank.

In either embodiment the original shape of the gasoline tank is not altered. Therefore, the motorcycle retains its original look.

It is an object of the present invention to enhance the visibility of a motorcycle during nighttime travel while not altering the original look of the motorcycle.

It is another object of the present invention to provide additional safety to a motorcyclist during nighttime travel.

It is a further object of the present invention to reduce the number of motorcycle related accidents.

It is yet another object of the present invention to increase the aesthetic beauty of a motorcycle.

It is still another object of the present invention to provide additional lighting on a motorcycle.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which.

DETAILED DESCRIPTION OF THE INVENTION

Figure 1:
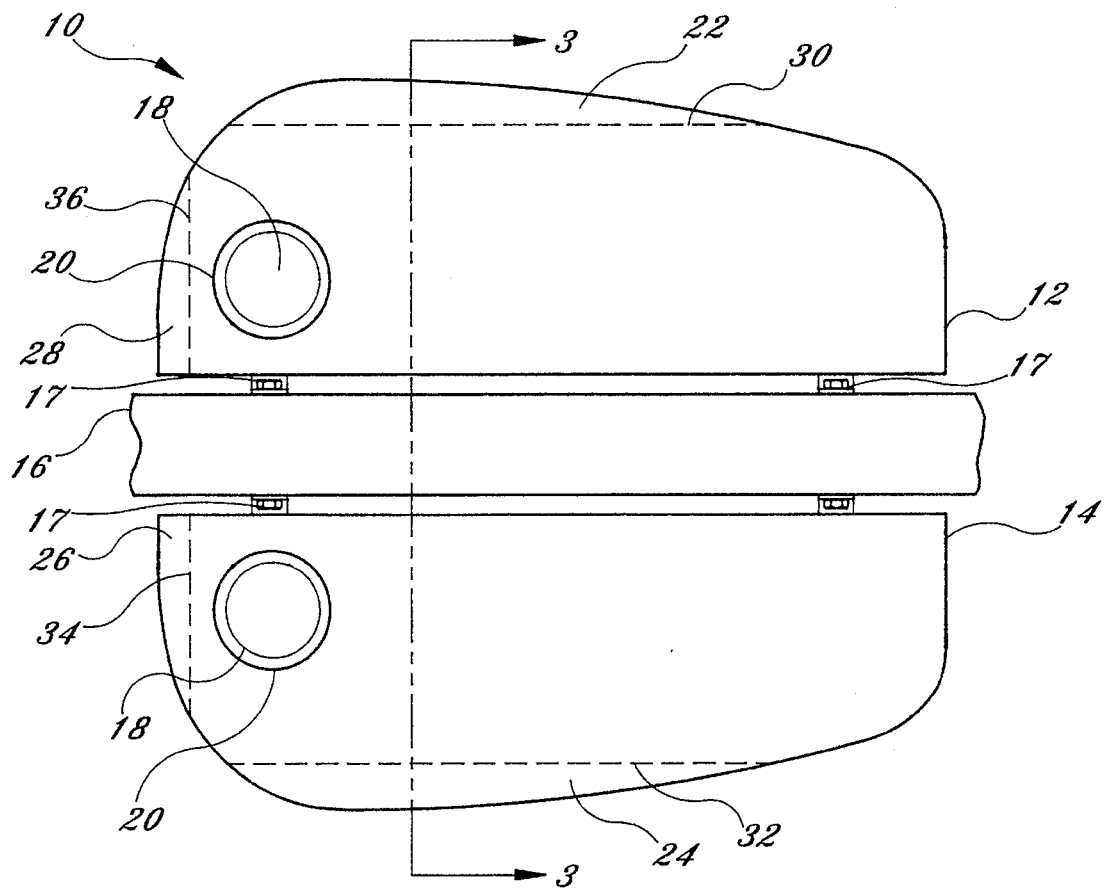
FIG. 1 is a top plan view of a motorcycle gasoline tank.
Figure 2:
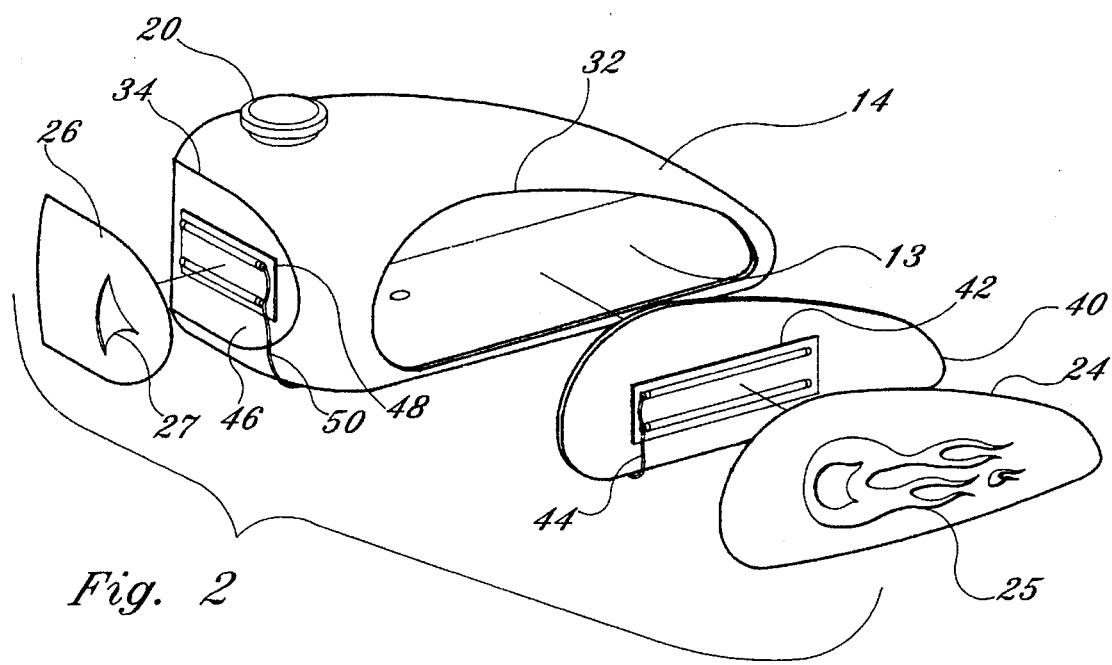
FIG. 2 is isometric exploded view of the first embodiment of the present invention.
Figure 3:
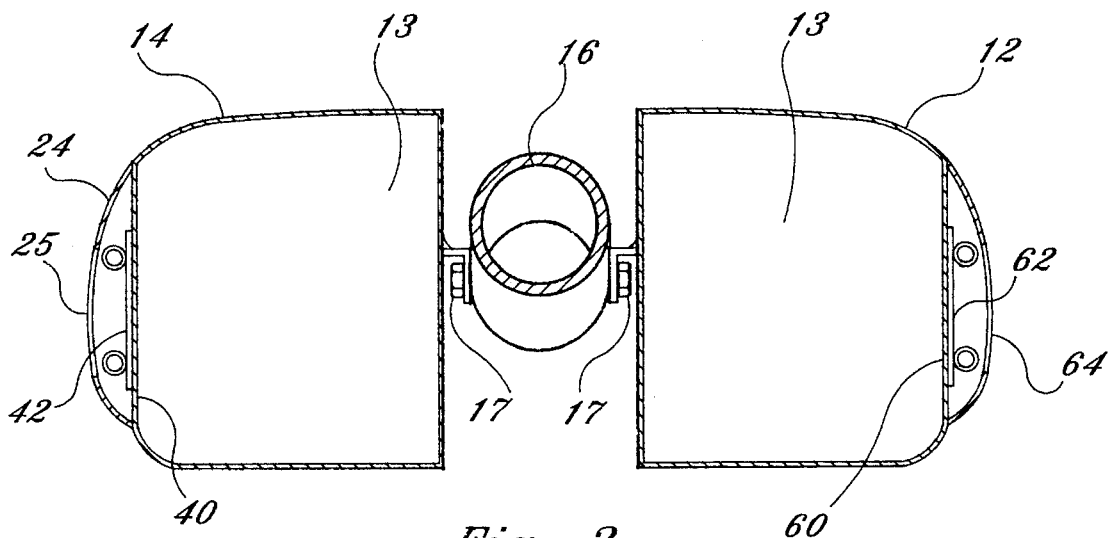
FIG. 3 is a sectional view taken along the line 3—3 of FIG. 1.
Figure 4:
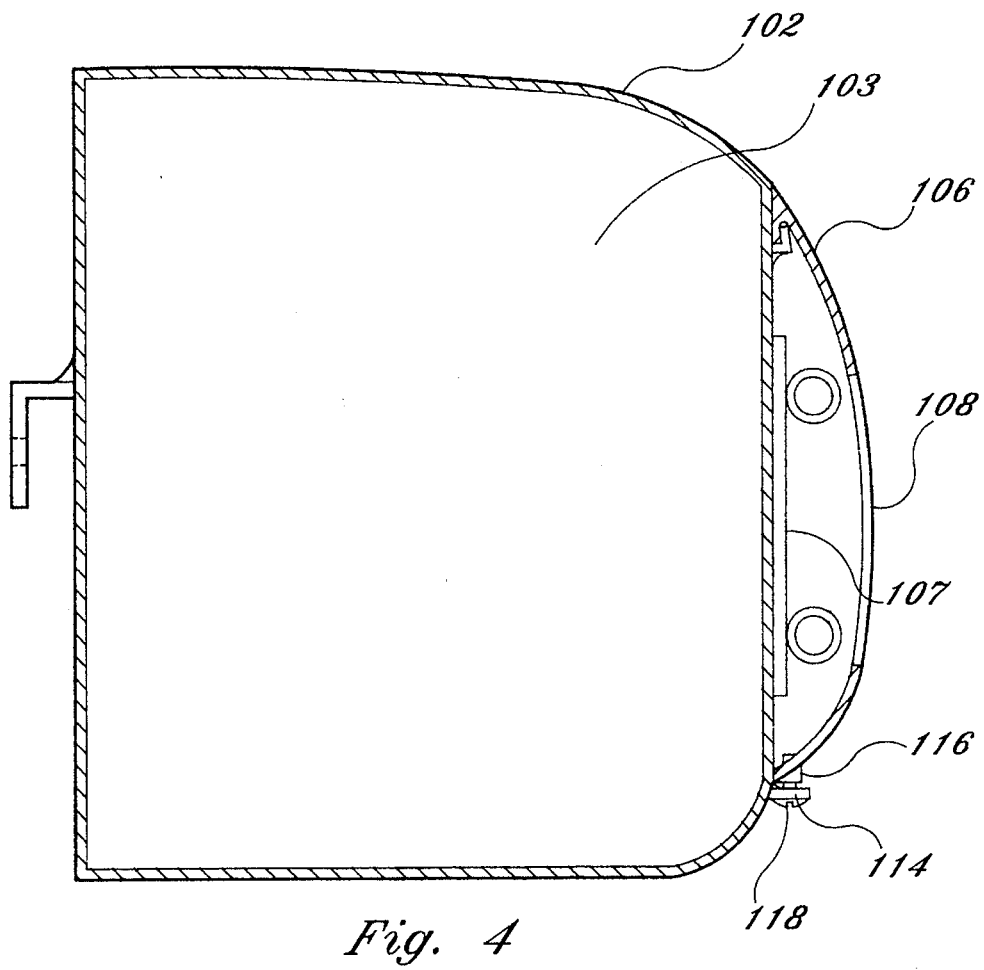
FIG. 4 is a sectional view of the second embodiment of the present invention.

The first embodiment of the present invention is shown in FIGS. 1–3. As seen in FIG. 1 a split gasoline tank 10 is generally shown as having a left side tank 14 and a right side tank 12 removeably connected to the motorcycle frame 16 by a series of bracket/bolt combinations 17. Fluid openings 18 are disposed on the top of tanks 12 and 14. A fluid cap 20 is also provided on the top of tanks 12 and 14 for sealing openings 18 as is conventional in the art. Gasoline tank 10 is disposed between the seat (not shown) and forks (not shown) of a motorcycle, typically at seat level.

As seen in the drawings a portion of the outside surfaces of tanks 12 and 14 as well as a portion of the front surfaces of the tanks is removed by conventional means, such as laser cutting, sawing, etc. Preferably, to create a uniformed look and to not destroy the aesthetics of the motorcycle, if one side portion is removed and altered in accordance with the present invention, then the other side portion will also be removed. However, the invention is not limited to such arrangement, and it is within the scope of the present invention to remove only a single outside portion. These design arrangements also apply to the front surface portion of tanks 12 and 14. Thus, any combination of the outside surfaces and front surfaces of tanks 12 and 14 is within the scope of the present invention. Furthermore, one or both of the front surfaces alone or one or both of the outside surfaces alone can also be removed and is within the scope of the present invention.

Though gasoline tank 10 is shown as a split tank, it is to be understood that this is not limiting and it is within the scope of the present invention to utilize a single tank gasoline tank in replace of the split tank. Furthermore, the location of the gasoline tank on some brands of motorcycles is different than that described above. These motorcycles typically place the gasoline tank underneath the seat of the motorcycle and place a hollow shell resembling a gasoline tank between the seat and forks. Thus, it is also to be understood, that these hollow shells are also within the scope of the present invention. Accordingly, all references to a "tank" hereinafter shall also mean a hollow shell.

As mentioned above, an outside surface portion and a front surface portion can be removed from tank 14 to create a side panel 24 and a front panel 26. However, the removal of such panels does not affect the location or function of opening 18 and gas cap 20. The removal of panels 24 and 26 from tank 14 create openings 32 and 34, respectively, exposing the inside area 13 where the gasoline is normally retained. Thus, to establish a gasoline tank flat side panel 40 and flat front panel 46 are welded into openings 32 and 34, respectively. Similarly, as seen in FIG. 1, if the outside surface portion and front surface portion of tank 12 are removed, openings 30 and 36, respectively will be created. In this situation the removal of these surface portions creates second side panel 22 and second front panel 28. Thus, to establish a gasoline tank with these surface portions removed, a second flat side panel 60 (FIG. 3) and a second flat front panel (not shown) are also welded into openings 30 and 36, respectively.

Illumination means 42 is shown attached to the outside surface of flat side panel 40 by conventional means such as screws, bolts, glue, hook and loop fasteners, etc. Similarly, illumination means 48 is shown attached to flat front panel 46. Illumination can be at least one light circuit and one light bulb. Electrical wires or cords 44 and 50 are shown attached to and hanging down from illumination means 42 and 48, respectively. Cords 44 and 50 are attached to the motorcycle battery (not shown) or other electrical circuits of the motorcycle according to the pattern of light desired, i.e. continuously on, flashing, wired to flash in conjunction with turning, etc.

An opening 25 and 27 is provided through panels 24 and 26, respectively in order to see illumination means 42 and 48, respectively. Opening 25 or 27 can be of any design desired by the motorcyclist to correspond with the motorcyclist's image. All that is necessary is that sufficient light, from the respective illumination means, is seen through openings 25 and 27. Preferably, openings 25 and 27 can be created by laser cutting, which provides the accuracy when a detailed design opening is required. However, the present invention is not limited to such and other conventional detail cutting methods are within the scope of the present invention. Clear or different colored tint glass can be inserted in openings 25 or 27 to provide protection to illumination means 42 and 48, respectively.

Figure 6:
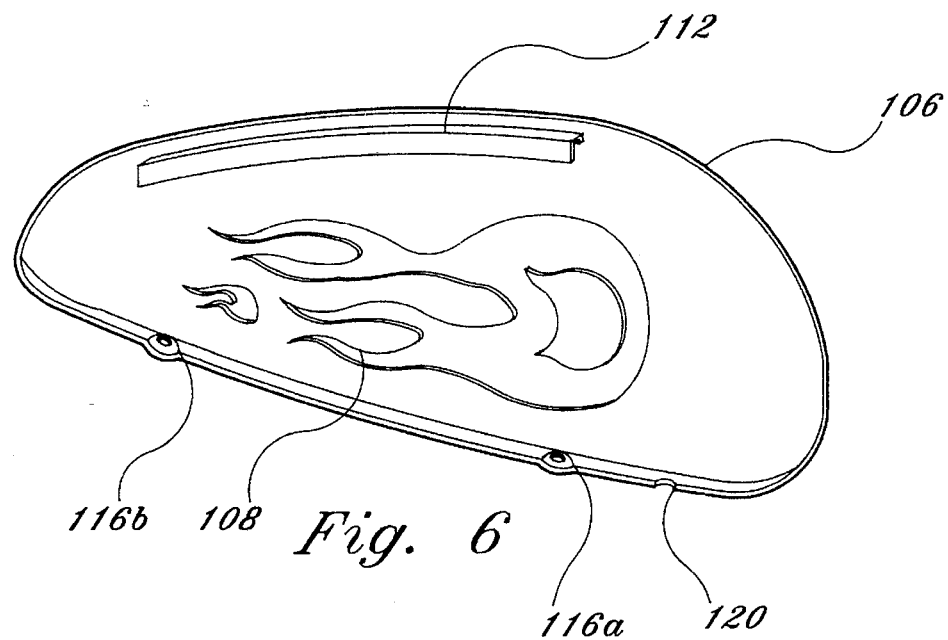
FIG. 6 is a perspective view of side panel shown in FIG. 5.

Once flat panels 40 and 46 have been welded to tank 14 at openings 32 and 34, respectively, panels 24 and 26, with their respective designs or openings 25 and 27, are ready to be attached to their respective original positions on tank 14. Panels 24 and 26 are attached by conventional means such as welding. A notch (see second embodiment FIG. 6) is provided in the bottom of panels 24 and 26 to create a passageway for cords 44 and 50. However, it is to be understood that the notch can be located anywhere on the panels and still be within the scope of the present invention. All that is required is that access is provided for the cords to the motorcycle's battery, electrical circuitry or wherever the cords are to be connected. After panels 24 and 26 are welded, tank 14 is repainted. Once repainted one viewing the tank will not be able to see that portions of the tank had been removed or altered.

Figure 5:
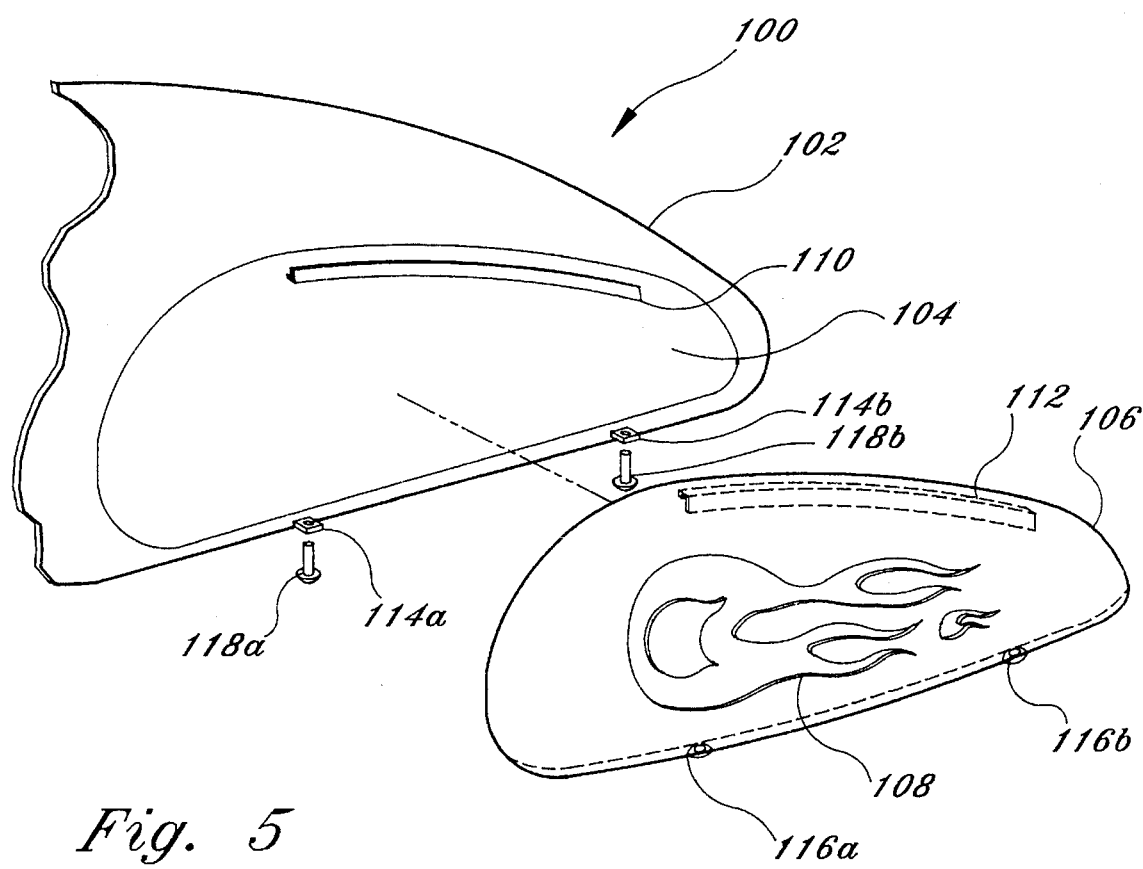
FIG. 5 is a isometric exploded view of the second embodiment of the present invention.

In the second embodiment of the present invention gasoline tank 102 is manufactured with flat side panel 104 or flat front panel (not shown) integrally constructed. Thus, the outline lines of flat side panel 104 shown in FIG. 5 are for illustration purposes only and do not appear on the commercial embodiment of the present invention, since the flat panel is part of the original constructed gasoline tank 102.

In this second embodiment, tank 102 is provided with connections means for attachment of one of a plurality of side panels 106. In the preferred embodiment, the connection means includes an elongated L-shaped bracket 110 attached to the outer surface of flat side panel 104 which is removeably connected to a corresponding elongated L-shaped bracket 112 attached to the inner surface of side panel 106. Bracket 112 is positioned inverted from bracket 110 to provide an interlock connection between the two brackets. Preferably, brackets 110 and 112 are welded to panels 104 and 106, respectively. Side panel retaining means is provided to help maintain the interlock between brackets 110 and 112. In the preferred embodiment, the retaining means is at least one nut 114, preferably two nuts (114a and 114b), welded to the bottom of tank 102. Corresponding nuts 116a and 116b (116 if only a single nut) are provided on the bottom of panel 106. However, the location of the retaining means will depend on the location of the connection means. All that is required is that side panel 106 does not come off during traveling. As such, various different locations along tank 102 for the connection means and retaining means are possible and are within the scope of the present invention.

Thus, to connect panel 106 to flat panel 104, bracket 112 is inserted within the channel disposed between by bracket 110 and flat panel 104. Panel 106 is pivoted around this mating point until nuts 116a and 116b are properly aligned with nuts 114a and 114b, respectively. Bolts 118a and 118b (118 if only a single nut) are inserted through the aligned centerholes of nuts 114a, 116a and 114b, 116b, respectively, to retain panel 106 in its locked position with panel 104. Alternatively, small locks (not shown) can be inserted through the centerholes of nuts 114a, 116a and 114b, 116b to help prevent panel 106 from being stolen.

Illumination means 107 can be provided attached to flat side panel 104 during the construction of gasoline tank 102. Similar to the first embodiment, illumination means 107 can be at least one light circuit and one light bulb. An electrical wire or cord (see first embodiment, not shown in second embodiment) is attached to and hanging down from illumination means 107. The cord is attached to the motorcycle battery (not shown) or other electrical circuits of the motorcycle according to the pattern of light desired, i.e. continuously on, flashing, wired to flash in conjunction with turning, etc. A notch 120 is provided in the bottom of panel 106 to create a passageway for the cord. However, it is to be understood that the notch can be located anywhere on the panel and still be within the scope of the present invention. All that is required is that access is provided for the cord to the motorcycle's battery, electrical circuitry or wherever the cords are to be connected.

If illumination means 107 is provided, then panel 106 must have an opening 108 in order to see such illumination. Opening 108 can be any design desired by the motorcyclist to correspond with the motorcyclist's image. All that is necessary is that sufficient light, from the illumination means, is seen through openings 108. Preferably, opening 108 is created by laser cutting, which provides the accuracy when a detailed design opening is required.

The second embodiment of the present invention can alternatively be used to allow the motorcyclist to have interchangeable side panels to suit his or her individual style. In such case, the motorcyclist chooses one from a plurality of side panels to be removeably attached to the motorcycle's gasoline tank or shell. The side panel is attached with the connection means and retaining means described above. However, when attaching to a shell, the flat side panel is not required as long as connection means and retaining means is provided on the tank itself. In this alternative second embodiment no illumination means or notch is required. Thus, it is optional whether to create an opening in the side panel. In the preferred embodiment, no opening would be created and the side panel would have different designs painted on its outside surface.

When it is desired to replace or interchange the side panel disposed on tank 102 with a different panel, bolts 118a and 118b are removed from the nuts 114a, 114b and 116a, 116b, respectively, thus releasing the retaining connections of the nuts. The interconnection between brackets 110 and 112 is also released, thus, allowing the side panel to be removed. A different side panel, having the same connection means and retaining means in design and position as the replaced side panel, is then connected to tank 102 as described above for side panel 106. Thus, the second embodiment of the present invention provides the motorcyclist with a limitless amount of design patterns for the tank of his or her motorcycle.

It is to be understood that the teachings of the different embodiments of the present invention can be applied to either of the front surface or either of the side surfaces of the gasoline tank or shell. For example, though the second embodiment only discusses one side panel it is to be understood that such teaching is applicable to either side panel as well as either front panel. Additionally, though the first embodiment only describes a single front surface and a single side surface, it is to be understood that such teaching is applicable to either side panel as well as either front panel.

Furthermore, it is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. An interchangeable side panel for removable attachment to a gasoline tank of a motorcycle or a hollow body shell disposed where a conventional motorcycle gasoline tank is normally disposed, said side panel comprising:

a body member having an inner surface and an outer surface and having a shape of an outside side portion of said motorcycle gasoline tank; and means for removable attachment of said body member to the tank or shell for allowing one of a plurality of side panels to be selected and attached to said tank or shell, wherein the attachment of said body member to said tank or shell gives the appearance of a conventional motorcycle gasoline tank.

2. The interchangeable side panel of claim 1 wherein the gasoline tank or shell having at least one flat side wall, said flat side wall having an outer surface and an inner surface, wherein the attachment of said body member to said tank or shell causes said flat side wall and said body member to define an interior chamber therebetween.

3. The interchangeable side panel of claim 2, wherein said means for removable attachment comprises:

a first bracket attached to said flat side wall; and a second bracket attached to the inner surface of said body member, said second bracket positioned inverted to said first bracket for removable mating therewith.

4. The interchangeable side panel of claim 2 further comprising means for retaining said body member in its attached relationship with said tank or shell.

5. The interchangeable side panel of claim 4 wherein said means for retaining comprises:

at least one first nut having a centerhole and attached to said tank or shell;

at least one second nut having a centerhole and attached to the inner surface of said body member, wherein the attachment of said body member to said tank or shell allowing the centerhole of said second nut to be aligned with the centerhole of said first nut; and means for locking said second nut to said first nut.

6. The interchangeable side panel of claim 5 wherein said means for locking is a bolt.

7. The interchangeable side panel of claim 6 further comprising illumination means disposed within said interior chamber.

8. The interchangeable side panel of claim 7 wherein said illumination means is attached to the outer surface of said flat side wall.

9. The interchangeable side panel of claim 7 wherein said body member having a notch to allow an electrical cord attached to said illumination means and to be inserted through said notch during the attachment of said body member to said tank or shell.

10. The interchangeable side panel of claim 7 wherein said body member having an opening to allow light from said illumination means to be seen through said opening to aid in the visibility of the motorcycle.

11. The interchangeable side panel of claim 1 wherein said body member having a design disposed on its outer surface.

12. An interchangeable side panel for removable attachment to a gasoline tank of a motorcycle or a hollow body shell disposed where a conventional motorcycle gasoline tank is normally disposed, the gasoline tank or shell having at least one flat side wall, said flat side wall having an outer surface and an inner surface, said side panel comprising:

a body member having an inner surface and an outer surface and having a shape of an outside side portion of said motorcycle gasoline tank; and means for removable attachment of said body member to the tank or shell, said means for removable attachment comprising a first bracket attached to said flat side wall and a second bracket attached to the inner surface of said body member, said second bracket positioned inverted to said first bracket for removable mating therewith;

means for retaining said body member in its attached relationship with said tank or shell, said means for retaining comprising at least one first nut having a centerhole and attached to said tank or shell, at least one second nut having a centerhole and attached to the inner surface of said body member, wherein the attachment of said body member to said tank or shell allowing the centerhole of said second nut to be aligned with the centerhole of said first nut, and a bolt for insertion through the centerholes of said first nut and said second nut;

wherein the attachment of said body member to said tank or shell gives the appearance of said motorcycle gasoline tank.

13. The interchangeable side panel of claim 12 wherein said body member having a design disposed on its outer surface.

14. The interchangeable side panel of claim 12 further comprising illumination means disposed within said interior chamber.

15. The interchangeable side panel of claim 14 wherein said illumination means is attached to the outer surface of said flat side wall.

16. The interchangeable side panel of claim 14 wherein said body member having a notch to allow an electrical cord attached to said illumination means and to be inserted through said notch during the attachment of said body member to said tank or shell, said body member also having an opening to allow light from said illumination means to be seen through said opening to aid in the visibility of the motorcycle.

* * * * *